Oct. 8, 1968 | 3,405,378

PIERRE-REMEY-ALEXIS VINCENT-MARTIN

HIGH VOLTAGE COIL WITH FLAT DISKS

Filed June 15, 1966 | 5 Sheets-Sheet 1

PIERRE-REMEY-ALEXIS VINCENT-MARTIN

HIGH VOLTAGE COIL WITH FLAT DISKS

Filed June 15, 1966 5 Sheets-Sheet 3

Oct. 8, 1968 3,405,378

PIERRE-REMEY-ALEXIS VINCENT-MARTIN

HIGH VOLTAGE COIL WITH FLAT DISKS

Filed June 15, 1966 5 Sheets-Sheet 4

3,405,378
HIGH VOLTAGE COIL WITH FLAT DISKS

Pierre-Remey-Alexis Vincent-Martin, Aix-les-Bains, France, assignor to Alsthom-Savoisienne, Paris, France Filed June 15, 1966, Ser. No. 557,735
Claims priority, application France, June 17, 1965, 21,230; Nov. 4, 1965, 37,287
9 Claims. (Cl. 336—70)

ABSTRACT OF THE DISCLOSURE

A high-tension winding constituted of flat disk coils distributed in the form of double disks each comprising two single disks which are connected with one another and wound in opposite directions, each of said disks consisting of two winding portions being interleaved in series by means of one of the winding portions of the other single disk of the same double disk, said winding being characterized in that the high tension voltage between conductor portions disposed oppositely on the inner surfaces of consecutive disks are at most equal to the voltage between the input and the output of a double disk coil.

The present invention relates to high-tension windings constituted of superimposed flat disk coils having the same axis.

More particularly, the present invention relates to windings of the type wherein the disk coils are distributed in double disks, each formed of two single disks connected with one another and wound in opposite directions. Each single disk coil comprises two winding portions which are interleaved and which may comprise either one or several conductors arranged in parallel and coiled in a same plane between the inner edge and the outer edge of the single disk. The winding portions of each single disk are connected in series by means of one of the winding portions of the other single disk of the same double disk. As a result of this known arrangement, voltages between adjacent turns can be developed which are much greater than the tension between the extremities of a turn. However, with such arrangements the capacitive series coupling is increased and allows for an improvement of the distribution of shock tensions along the winding.

The present invention relates particularly to those windings of the above type wherein each single disk coil comprises on the inner surface thereof consecutively one portion of the each of the conductors which constitute the disk. This provision allows for constructing each disk around a spooling mandrel by applying to the latter successively each conductor for a part of its length so as to subsequently wind all of the conductors simultaneously around the mandrel.

The present invention is directed to an interleaved winding of this type which is characterized in that the dielectric holding property thereof is rendered more homogeneous by removing certain of the weak points of the winding which forcibly bring about a limitation of the maximum tension used therewith.

The present invention is directed particularly to an interleaved winding of the type indicated above wherein the maximum tension between the neighboring conductors on the inner surfaces of consecutive coils is at most equal to the tension between the input and the output of a double coil.

The high-tension winding according to the present invention is characterized in that the conductor portions being arranged oppositely—on the inner surfaces of two consecutive single disks of different double disks which are both delimited by the same radial planes of the winding, include alternately both the winding portion being traversed in the first instance by the current in the disk and the winding portion being traversed by the current in the second place.

Other characteristics and advantages of the invention will appear in the following description of several exemplary embodiments of the invention when considered in connection with the attached drawings, in which.

The high voltage coils shown in FIGURES 1, 2, 4 and 5 are situated around a magnetic core N on the exterior of a low voltage winding of a transformer shown schematically at BT. The high-voltage coils are comprised by two double input disk coils (hereinafter referred to as disks) comprised of two simple disks A1, B1, and A2, B2, where the turns are in series following the numerical order illustrated. It should be noted, however, that the number of turns illustrated are cited merely to exemplify the construction in a simple and concise manner. In any practical coil utilizing the invention, the number of turns would be greatly in excess of those cited.

Figure 1:
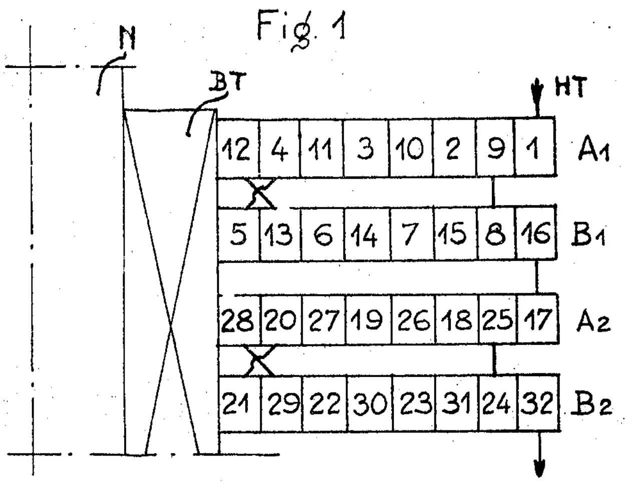
Fig. 1 PRIOR ART
FIGURE 1 is a schematic radial cross-sectional view of two double input disks of a high voltage coil where the disk conductors are interlaced in a previously known manner.

The single disks A1, B1, A2, B2 of the high voltage coil winding of FIGURE 1 are each formed in a known manner by the interlacing of conductor means forming two windings, respectively, in series. The disk A1 is comprised, for example, by a first conductor forming four turns 1, 2, 3, 4, and by a second conductor forming four turns 9, 10, 11, 12. The single disk B1 is comprised in like manner by two conductors forming the two windings 5 to 8 and 13 to 16. The winding portions 1 to 4 and 9 to 12 of the disk A1 are connected by the winding portions 5 to 8 of the disk B1. In a like manner, the winding portions 5 to 8 and 13 to 16 of the disk B1 are connected by the winding portions 9 to 12 of the disk A1. The disks A2 and B2 of the second double disk are comprised in a like manner.

The exterior turn 1 of the disk A1 is connected to the high voltage H.T. input and the current passes through this disk first from the exterior turn 1 to the interior turn 4 and secondly from the exterior turn 9 to the interior turn 12. In disk B1, the current first passes from the interior turn 5 to the exterior turn 8 and, secondly, from the interior turn 13 to the exterior turn 16 which comprises the output of the double disk A1, B1. The voltage on the terminals of the double disk A1, B1 is thus that of 16 turns while the voltage between the interior turns 12 and 5 is only seven turns.

Current passes through the disk plate A2 first from the exterior turn 17 to the interior turn 20 as in disk A1, and secondly from the exterior turn 25 to its interior turn 28. The voltage between the interior turns 5 and 28 of the disks B1 and A2 is consequently that of twenty-three turns, or nearly one and a half times the voltage at the terminals of a double disk.

It is known that the potential gradient between the interior turns of consecutive disks is increased by the proximity of the low voltage coil, or the proximity of the magnetic core where the low voltage coil is situated to the exterior of the high voltage coil.

The large potential difference between the interior turns 28 and 5 consequently forms a particularly weak point of the high voltage coil where there is a maximum risk of arc ignition, following a voltage rise such as occurs in a shock wave. The maximum voltage with which the coil can be used is thus limited by this weak point.

Figure 2:
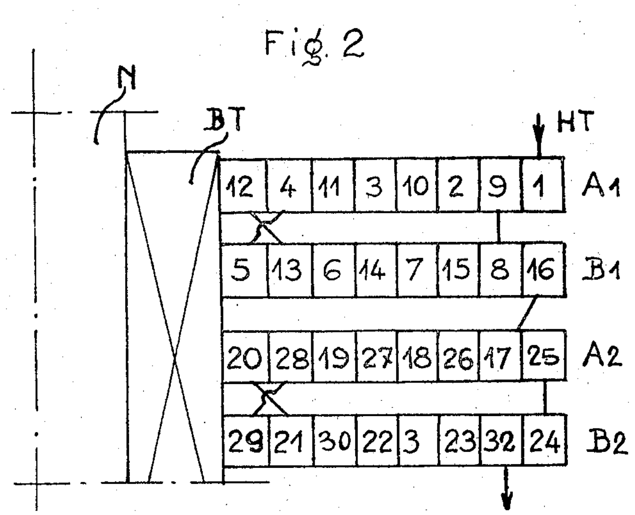
FIGURE 2 is a schematic radial cross-sectional view of two double input disks of a high tension coil where the disk conductors are interlaced in a different manner according to the invention.

According to the embodiment of the invention shown in FIGURE 2, the dielectric behavior between the interior turns of the two single consecutive disks B1 and A2, is greatly improved.

The double input disk A1, B1, according to FIGURE 2 is identical to the double input disk of the FIGURE 1 coil. The current passes in the same fashion in the disk B1, from the interior turn 5 to the exterior turn 8 and from the interior turn 13 to the exterior turn 16 which constitutes the output winding turn of the double disk A1, B1.

The following disks A2 and B2 have a like construction in that each of the winding portions in each disk being interlaced in series by way of one of the winding portions of the other disk. However, current first passes through the disk A2 from the exterior turn 17 to the interior turn 20 which is disposed opposite the interior turn 5 of disk B1, and is delimited by the same radial planes. Thus, it can be seen that turn 20 belongs to the first winding portion traversed by the current and not to the second winding portion as in the coil construction shown in FIGURE 1. The potential difference between this interior turn 20 and the interior turn 5 of the disk B1 is only fifteen turns, or less than the voltage at the terminals of a double disk.

However, this desirable result will not be sufficient if from this new arrangement of interlaced turns, there should result elsewhere in the coil structure, in the passage zone from one turn to another and from one disk to another, a larger potential difference between the turns disposed opposite one another than between the interior turns 5 and 20. This is particularly true of any such opposing turns that are near the interior surface of the coil. A very short length of such conductors would obviously be sufficient to form a weak point where the dielectric behavior will limit the voltage that can be used with the coil in an undesirable manner.

Figure 3:
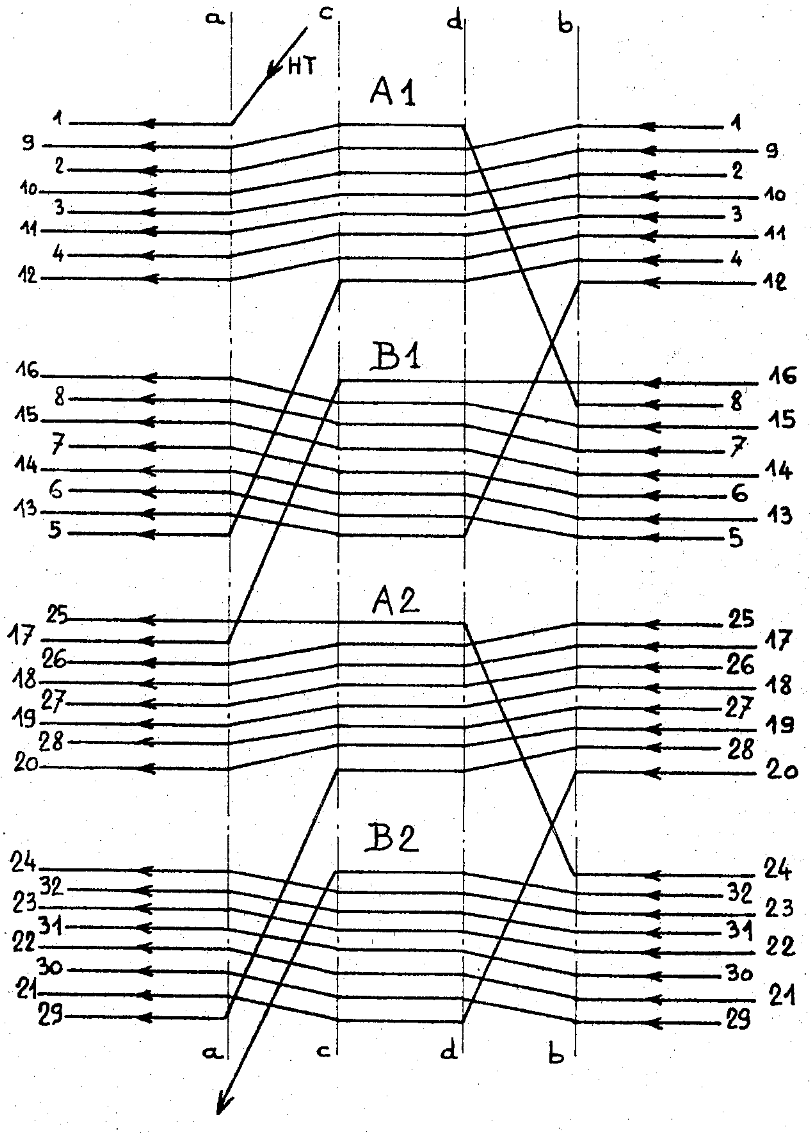
FIGURE 3 is partially developed schematic wiring diagram of each of the disks of FIGURE 2, between planes situated on one side and on the other of conductor leadins from one turn to another and from one disk to another.

The schematic wiring diagram of FIGURE 3 shows that such weak points are entirely avoided. The passage zone from one turn to another and from one disk to another is delimited by the planes *a—a* and *b—b*. Outside this zone, the windings have essentially flat circular trajectories only a small portion of which is represented. The current circulates in the direction of the arrows, entering a new turn generally along plane *a—a* and leaving along plane *b—b* to pass to the following turn.

An examination of FIGURE 2 will reveal that two consecutive turns of a winding portion have a turn of another winding portion of the same disk interposed between them. For this reason, the passage between the two consecutive turns of a given disk, shown in FIGURE 3 as lying between the planes *c—c* and *d—d*, comprises an arc of a circle trajectory with the same radius as that of the interposed winding. On its interior face, between the planes *c—c* and *d—d*, the disk B1 includes a length of conductor which is at the potential of the winding 13. Opposite this length of conductor on the interior surface of disk A2 and between the planes *c—c* and *d—d* is a conductor portion with the potential of the turn 28. The potential difference between these two conductor portions will thus be that of fifteen turns or less than the potential difference at the terminals of a double disk.

Figure 4:
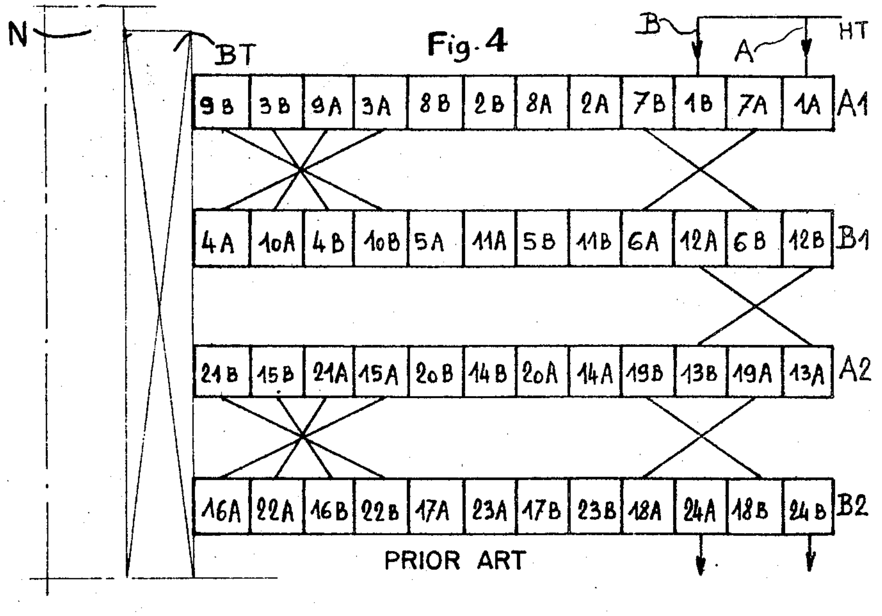
FIGURE 4 is a schematic radial cross-sectional view of two double input disks of a high voltage coil formed from two parallel conductors wherein the disk conductors are interlaced in a known manner.
Figure 5:
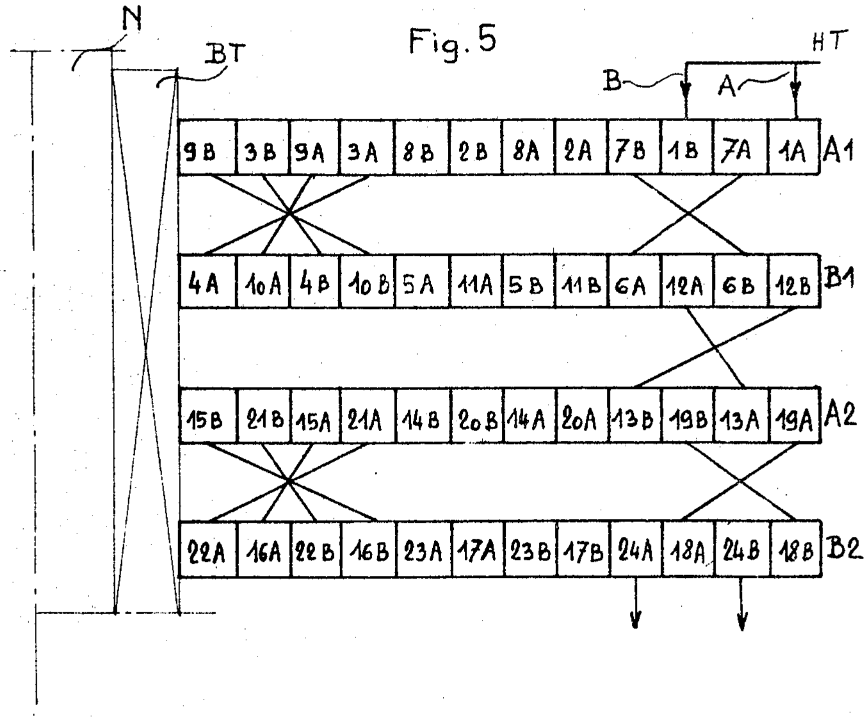
FIGURE 5 is a schematic radial cross-sectional view of two double input disks of a high voltage coil employing two parallel conductors wherein the disk conductors are interlaced according to the invention.

FIGURES 4 and 5 of the drawings illustrate other embodiments of high voltage coils, FIGURE 4 being a known coil and FIGURE 5 being constructed in accordance with the invention. The high voltage coils represented in FIGURES 4 and 5 utilize conductor means formed by a dual conductor winding, and are situated around a magnetic core N to the exterior of the low voltage coil B.T. of a transformer in a like manner to the coils of FIGURES 1 and 2. The coils are comprised by two double input disks having two single disks A1 and B1, A2 and B2. Each disk is made up of two conductors A and B which are connected in parallel to the high voltage terminal H.T. The turns of the disks are connected in series following the numeration from 1A to 24A and from 1B to 24B. Again, the number of turns per disk obviously have been reduced to clarify the drawings, and any practical coil would have a number of turns considerably in excess of those shown.

A coil of a known type, according to FIGURE 4, is made up of disks each comprising two winding portions of two conductors A and B. The first winding portion of the disk A1 comprises the turns 1A, 2A, 3A, in parallel with the turns 1B, 2B, 3B. The turns of this first winding portion are interlaced with those of the second winding portion which comprises the turns 7A, 8A, 9A, in parallel with the turns 7B, 8B, 9B. These two winding portions are in series by way of the winding portion of the disk B1 comprised by the turns 4A, 5A, 6A, in parallel with the turns 4B, 5B, 6B. The disk B1 is made up following the same principle and comprises two winding portions in series by way of the winding portion 7A, 8A, 9A, and 7B, 8B, 9B, of the disk A1. The second double disk A2, B2, is made up identically to the first.

From the above description, it wil be seen that each single disk is formed by four lengths of conductors each forming three turns. The interior extremities of the four conductor lengths which comprise the two windings of a single disk are respectively connected to the interior extremities of four conductor lengths which comprise the two windings of the other single disk of the same double disk. Also, it is known that the potential gradient between conductors on the interior surfaces of consecutive disks is increased by the proximity of the low voltage coil, or by the proximity of the magnetic core should the low voltage coil be situated to the exterior of the high voltage coil.

An examination of FIGURE 4 will reveal that the portion of conductor 4A, on the interior surface of the disk B1, is opposite the conductor part 21B on the interior surface of the disk A2. These opposing adjacent turns thus have a potential difference of seventeen turns between them, while the potential difference between the input and the output of a double disk is only 12 turns. As a consequence, the coil structure of FIGURE 4 posesesses an inherent weak point subject to breakdown, and limits the voltage that can be applied to the coil undesirably.

The coil, according to FIGURE 5, avoids this weak point which limits the voltage that may be applied to the coil. The double input disk A1, B1 of the coil shown in FIGURE 5 is formed similar to that in FIGURE 4; however, the second double disk A2, B2, differs in that the conductor portion 15B which appears on the interior of the disk A2 is at a potential which only differs from that of the opposing turn 4A in disk B1 by eleven turns. Thus, the potential difference between these two conductor portions wil be less than the potential difference at the terminals of a double disk.

The cross-sectional view shown in FIGURE 5 is only schematic. Such disks are constructed on a mandrel, and it is necessary that the four conductors which form the two windings each successively contain a conductor portion at the bottom of the disk. Each disk must thus consecutively comprise around the length of the periphery of its interior surface, a portion of four conductors. This is best seen in FIGURE 6, which schematically shows a wiring diagram of each of the disks and illustrates the passages between concentric layers and between disks.

According to the arrival order of the turns at the bottom of each disk, its interior surface successively comprises a conductor portion starting at the *a—a* plane and ending at the *h—h* plane, then a conductor portion between the *d—d* plane and the *e—e* plane, and then a conductor portion between the *f—f* plane and the *g—g* plane. By traversing across this interior winding, it will be seen that the conductor portions thus placed adjacent each other and in opposition to the interior surface of the opposite consecutive disk, both alternately belong to the winding portion first traversed and to the winding portion secondly traversed by the current in their own disk. The result is that the potential difference between each of the opposite portions is only that of eleven turns, or less than the total number of turns of a double disk. This result is obtained without having to modify the number of conductor layers in a single disk or their radial planes. For example, the exterior surface of the disk A2 is occupied by input portions of the turns 19A and 19B by which the current enters the winding during its second traversal in the disk A2. These turns are disposed opposite turns 12A and 12B of disk B1. It can be seen then that the exterior surface of the disk B1 is occupied by turns 12A and 12B of the last winding portion traversed by the current in the double disk A1, B1. Hence, the potential across these sets of opposing turns is considerably less than the potential across a double disk.

Figure 6:
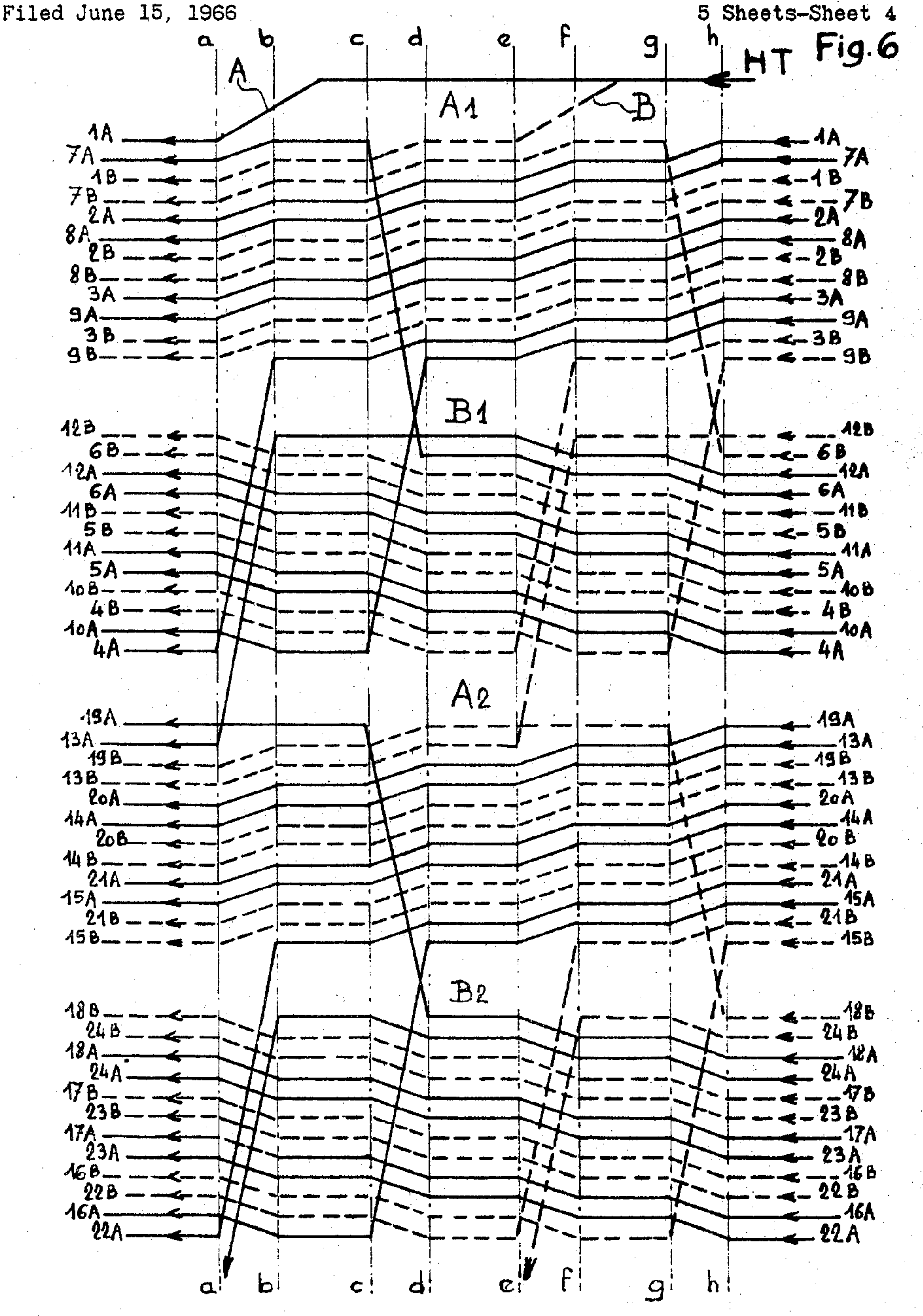
FIGURE 6 is a partially developed schematic wiring diagram of each of the disks of FIGURE 5.
Figure 7:
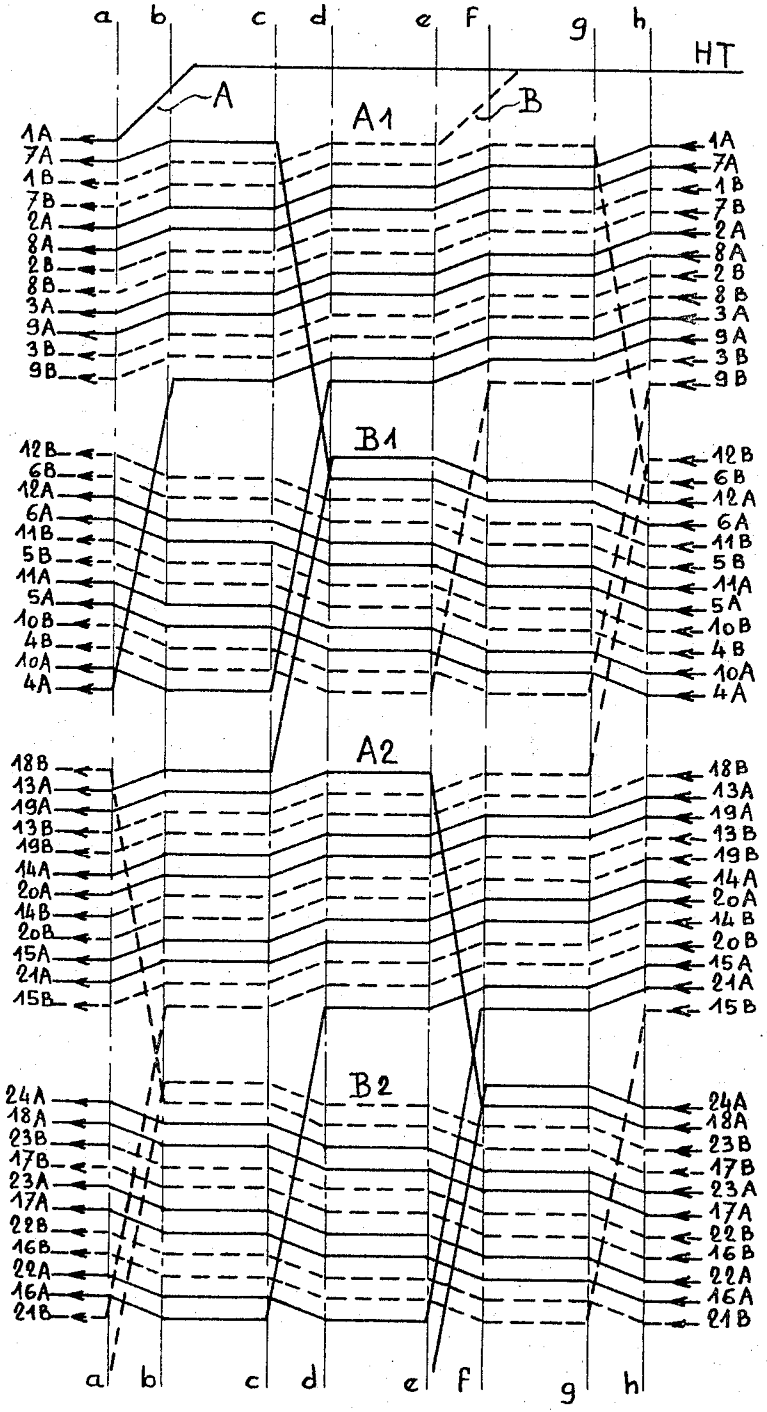
FIGURE 7 is a partially developed schematic wiring diagram of each of the disks of a variation of the coil illustrated in FIGURES 5 and 6.

This result can still be obtained following the variation represented in FIGURE 7 which is a schematic wiring diagram, analogous to that shown in FIGURE 6. This coil is also formed by two conductors A and B connected in parallel to a high voltage terminal H.T. The two double input disks A1, B1, and A2, B2 are identical with the exception of the manner of their cross connection. Their disks are made of two interlaced windings, as in the preceding example, but the conductor portions on their interior surfaces are all of equal length, and are equally spaced in each disk. As was said, the conductor portions follow each other along the interior surface of the disks, according to the arrival order of turns at the bottom of the disk. The interlaced turns belong successively to the first and second winding portions traversed by the current in the disk. The conductor portions along the interior face of the disk thus belong alternately to the first and second winding portions traversed by a current in their disk. It thus suffices to adjust disk A2 in relation to disk B1 so that the two conductor portions opposite each other on their interior surfaces which are delimited by the same radial planes both alternately belong to winding portions first traversed by the current, then to winding portions secondly traversed by the current in their own disk.

This result can still be obtained with double successive identical disks, where the conductor portions along the interior surfaces of the disks have unequal lengths. The conductor portions, starting from the plane *a—a* to end in the plane *h—h*, can, for example, be much larger than the others and form the largest portion of the interior and exterior surfaces, even where the opposite conductor portions on the interior surfaces of the disks are delimited by the same radial planes. The inputs of each of the parallel conductors must be connected to conductor portions on the exterior surfaces of the disks A1 and A2. These conductor portions are interposed, one in relation to the other, in the two disks, as is represented in FIGURE 7 so that the pairs of opposite conductor portions on the interior surfaces of the disks B1 and A2 alternately belong to the winding portion first traversed and the winding portion secondly traversed by the current in one and the other of the disks B1 and A2.

Having described several embodiments of a new and improved high voltage coil constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

I claim:

1. A high voltage coil formed of flat annular disks superposed with the same axis, comprising several double consecutive disks formed of two single disks which are interconnected at their exterior and interior turns and which are each constituted by two interlaced windings each comprising conductor means wound in the same plane between the exterior edge of a single disk and its interior edge, each disk alternately comprising a first winding portion that is first traversed by a current flowing through the disk and a second winding portion that is traversed secondly by a current flowing through the disk, the winding portions of each single disk being connected in series by way of one of the two winding portions of the opposite single disk of the same double disk, the high voltage coil being characterized by the fact that the opposite winding turns defining the interior surfaces of the two single consecutive disks of different double disks and which are delimited by the same radial planes, alternately belong to a winding portion first traversed and to a winding portion secondly traversed by the current in the single disk in which they are disposed so as to result in the number of series turns between the opposed winding turns in the said two single consecutive disks being no greater than the total number of series turns of the same conductor in a double disk.

2. A high voltage coil according to claim 1, further characterized by the fact that the said single consecutive disks of double different disks have the same number of turns in their radial planes and the exterior surface of the second of these single consecutive disks comprises input conductor portions of the said winding portion traversed secondly by the current in this disk.

3. A high voltage coil according to claim 1, further characterized by the fact that the single consecutive disks of double different disks identically comprise, along their interior surfaces, conductor portions of the same length, equally spaced, which alternately belong to one and the other winding portion of their own disk, these conductor portions being angularly displaced with respect to each other so that the opposed conductor portions on the interior surfaces thereof delimited by the same radial planes both alternately include a winding portion traversed first and a winding portion traversed secondly by the current in the disk in which they are disposed.

4. A high voltage coil according to claim 1, further characterized by the fact that the double consecutive disks comprise, along the interior and exterior surfaces of their single disks, conductor portions where at least one has a different length from that of the other and where the opposite conductor portions of the two disks are delimited by the same radial planes, the inputs of the double disks being connected on the exterior face of their first single disk to conductor portions which are angularly displaced from one disk to the other so that the opposite conductor portions on the interior surfaces on the single consecutive disks of double different disks both alternately include winding portions first traversed by the current and winding portions traversed secondly by the current in the disk in which they are disposed.

5. A high voltage coil according to claim 1, wherein the conductor means comprise a plurality of conductors connected in parallel.

6. A high voltage coil according to claim 3, wherein the conductor means comprise a plurality of conductors connected in parallel.

7. A high voltage coil according to claim 4, wherein the conductor means comprises a plurality of conductors connected in parallel.

8. A high voltage coil according to claim 3, further characterized by the fact that the double consecutive disks comprise, along the interior and exterior surfaces of their single disks, conductor portions where at least one has a different length from that of the other and where the opposite conductor portions of the two disks are delimited by the same radial planes, the inputs of the double disks being connected on the exterior face of their first single disk to conductor portions which are angularly displaced from one disk to the other so that the opposite conductor portions on the interior surfaces on the single consecutive disks of double different disks both alternately include winding portions first traversed by the current and winding portions traversed secondly by the current in the disk in which they are disposed.

9. A high voltage coil according to claim 8, wherein the conductor means comprises a plurality of conductors connected in parallel.

References Cited

UNITED STATES PATENTS

| | | | |
|---|---|---|---|
| 2,453,552 | 11/1948 | Stearn | 336—70 X |
| 3,029,402 | 4/1962 | Highton | 336—69 X |

FOREIGN PATENTS

| | | |
|---|---|---|
| 220,705 | 9/1961 | Austria. |

OTHER REFERENCES

German application No. 1,114,922, published Oct. 12, 1961, Gadek.

German application No. 1,169,575, published May 6, 1964, Wionsek.

LEWIS H. MYERS, *Primary Examiner.*

T. J. KOZMA, *Assistant Examiner.*